(12) United States Patent
Goswamee et al.

(10) Patent No.: US 9,616,412 B2
(45) Date of Patent: Apr. 11, 2017

(54) MIXED METAL OXIDIC NANO SHEETS COATED MONOLITHIC CATALYSTS USEFUL FOR THE DECOMPOSITION OF TOXIC $N_2O$ AND A PROCESS FOR THE PREPARATION THEREOF

(71) Applicant: COUNCIL OF SCIENTIFIC & INDUSTRIAL RESEARCH, New Delhi (IN)

(72) Inventors: Rajib Lochan Goswamee, Jorhat (IN); Mridusmita Mishra, Jorhat (IN); Anil Kumar Sarma Baruah, Jorhat (IN)

(73) Assignee: COUNCIL OF SCIENTIFIC & INDUSTRIAL RESEARCH, New Delhi (IN)

( * ) Notice: Subject to any disclaimer, the term of this patent is extended or adjusted under 35 U.S.C. 154(b) by 0 days.

(21) Appl. No.: 14/646,333

(22) PCT Filed: Nov. 25, 2013

(86) PCT No.: PCT/IN2013/000713
§ 371 (c)(1),
(2) Date: May 20, 2015

(87) PCT Pub. No.: WO2014/080428
PCT Pub. Date: May 30, 2014

(65) Prior Publication Data
US 2015/0290625 A1    Oct. 15, 2015

(30) Foreign Application Priority Data

Nov. 23, 2012 (IN) .......................... 3597/DEL/2012

(51) Int. Cl.
*B01D 53/86* (2006.01)
*B01J 21/16* (2006.01)
(Continued)

(52) U.S. Cl.
CPC ........ *B01J 23/755* (2013.01); *B01D 53/8628* (2013.01); *B01J 21/16* (2013.01);
(Continued)

(58) Field of Classification Search
CPC .............. Y02C 20/10; B01D 2257/402; B01D 53/8628; B01D 2255/2047; B01D 2255/00;
(Continued)

(56) References Cited

U.S. PATENT DOCUMENTS 5,407,652 A * 4/1995 Swamy .............. B01D 53/8628
423/239.1
5,472,677 A 12/1995 Farris et al.

OTHER PUBLICATIONS

Mridusmita Mishra et al.: "Improvement of the mechanical strength of alumina preforms by coating with montmorillonite/LDH gels", Applied Clay Science, Elsevier Science, NL. vol. 53, No. 1, Apr. 8, 2011 (Apr. 8, 2011), pp. 8-14 [retrieved on Apr. 21, 2011].
(Continued)

*Primary Examiner* — Timothy Vanoy
(74) *Attorney, Agent, or Firm* — Workman Nydegger (57) ABSTRACT

A process for the preparation of nano-oxide coated catalysts useful for the treatment of toxic gases by coating of composite materials containing LDHs over ceramic monolithic substrates. The process combines reacting oxides and salts of metals so as to prepare LDHs or mixed metal layered hydroxides possessing positive layer charge, from which a stable gel is prepared by adding swellable clay having a negative charge in different LDH:clay ratio in an aqueous medium and homogenizing the same in a high intensity ultrasonic processor. The gel is then dip-coated over cordierite/mulite honey-comb monolithic supports at various dipping and withdrawal rates. The dip-coated monoliths are then dried and calcined at different temperatures to develop the alumino-silicate supported nano-oxide coats over honey-
(Continued)

comb ceramic substrates for carrying out decomposition of N20 gas in a He flow in various flow rates at 400 to 600° C. temperature in a cylindrical quartz tube.

9 Claims, 6 Drawing Sheets (51) Int. Cl.
  B01J 37/00 (2006.01)
  B01J 37/08 (2006.01)
  B01J 23/755 (2006.01)
  B01J 23/26 (2006.01)
  B01J 23/00 (2006.01)
  B01J 35/04 (2006.01)
  B01J 37/34 (2006.01)
  B01J 37/02 (2006.01)
(52) U.S. Cl.
  CPC .......... B01J 23/007 (2013.01); B01J 23/26 (2013.01); B01J 35/04 (2013.01); B01J 37/0215 (2013.01); B01J 37/08 (2013.01); B01J 37/343 (2013.01); B01D 2255/2047 (2013.01); B01D 2255/2092 (2013.01); B01D 2255/20753 (2013.01); B01D 2255/20784 (2013.01); B01D 2255/20792 (2013.01); B01D 2255/9022 (2013.01); B01D 2255/915 (2013.01); B01D 2257/402 (2013.01); Y02C 20/10 (2013.01)

(58) Field of Classification Search
  CPC . B01J 21/16; B01J 37/343; B01J 37/08; B01J 37/0215; B82Y 40/00; B82B 1/008
  See application file for complete search history.

(56) References Cited

OTHER PUBLICATIONS

Obalova L. et al.: "Structure-activity relationship in the N20 decomposition over Ni—(Mg)—Al and Ni—(Mg)—Mn mixed oxides prepared from hydrotalcite-like precursors", Journal of Molecular Catalysis A: Chemical, Elsevier, Amsterdam, NL, vol. 248, No. 1-2, Apr. 3, 2006 (Apr. 3, 2006), pp. 210-219.
Oi et al: "Zn, Al, Rh-mixed oxides derived from hydrotalcite-like compound and their catalytic properties for N20 decomposition", Applied Catalysis B Environmental, Elsevier, Amsterdam, NL, vol. 13, No. 3-4, Nov. 14, 1997 (Nov. 14, 1997) pp. 197-203.
T Egerton: "The catalytic activity of chromium ions in magnesium aluminate for the decomposition of nitrous oxide", Journal of Catalysis, vol. 19, No. 1, Oct. 1, 1970 (Oct. 1, 1970), pp. 74-81.
PCT/IN2013/000713, Apr. 4, 2014, International Search Report and Written Opinion.
PCT/IN2013/000713, Feb. 16, 2015, International Preliminary Report on Patentability.

* cited by examiner

MIXED METAL OXIDIC NANO SHEETS COATED MONOLITHIC CATALYSTS USEFUL FOR THE DECOMPOSITION OF TOXIC $N_2O$ AND A PROCESS FOR THE PREPARATION THEREOF

TECHNICAL FIELD OF THE INVENTION

The present invention relates to mixed metal oxidic nano sheets coated monolithic catalysts useful for the decomposition of toxic $N_2O$ and a process for the preparation thereof. More particularly, the present invention relates to coating of a honey-comb ceramic monolith by a stable aqueous gel containing Layered Double hydroxides (LDHs) as one of the vital component to prepare a catalyst for decomposition of an environmentally harmful toxic gas having global warming potential e. g. $N_2O$.

BACKGROUND AND PRIOR ART OF THE INVENTION

References may be made to previous works on different catalytic materials such as Fe-MFI [J Péréz-Ramiréz et al. Catal. Commun. 3(2002) 19-23, J Péréz-Ramiréz et al. J. Catal. 214 (2003) 33-45; J Péréz-Ramiréz et al. Appl. Catal. B: Environmental 35, (2002), 227-234]; LDHs [Dandl & Emig Appl. Catal. A: General 168 (1998) 261-268; Kannan & Swamy Appl. Catal. B: Environmental 3, (1994), 109-116; Armor et al. Appl. Catal. B: Environmental 7, (1996), 39-406; Drago et al. Appl Catal B: Environmental 13 (1997) 69-79; M. C. Roman-Martinez et al. Appl. Catal. A: General 225 (2002) 87-100; J Péréz-Ramiréz et al. Appl. Catal. B: Environmental 25 (2000) 191-203; Catal. Lett. 60, 1999 133-138, K. Karásková et al.Chem. Eng. J 160 (2010) 480-487, S. Kannan, Catal. Surv. Asia 10 (2006) 117-136, F. Kovanda et al. J. Solid State Chem. 179 (2006) 812-823]; SBA-15 based catalysts [Xiaoding Xua et al. Appl Catal B: Environmental 53, (2004), 265-274); Catal. Lett. 93 (2004) 113-120]; Co or Ni supported on MgO [Izumi et al. Chem. Lett. (1998), 727-728, Chem. Commun. (2000), 1053-1054]; Pd-ZSM-5, Fe-ZSM-5 [Izumi et al. Bull. Chem. Soc. Jpn. 74 (2001) 1499-1505, Pirngruber et al. J Catal. 22 (2004) 429-440, Perez-Ramirez et al. Kinet. Catal. 44 (2003) 639-647, J Péréz-Ramiréz et al. Catal. Today 76 (2002) 55-74, I. Melián-Cabrera et al. J. Catal. 238 (2006) 250-259], mixed oxide catalysts [K. Galejová et al. Chem. Pap. 63 (2009) 172-179] iron incorporated aluminophosphate molecular sieves Fe-FAPO-5 (FAPO) [W. Wei et al. J. Catal. 262 (2009) 1-8, W. Wei et al. Microporous Mesoporous Mater. 112 (2008) 193-201], zeloite coating on solis supports [J. C. Jansen et al. Microporous Mesoporous Mater. 21 (1998) 213-226] Rh supported on metal oxides like ZnO or $CeO_2$ [Oi et al. Appl Catal B: Environmental 12 (1997) 277-286, Chemistry Letters (1995) 453-454, Doi et al. J. of Chem. Engg of Japan 36, 5, (2003), 548 556], Fe-Ferrierite catalysts [I. Melia' n-Cabrera et al. Catal. Commun. 6 (2005) 301-305]. In all of these experiments catalytic decomposition was carried out at temperatures above 700° C. which thus would require heating of the gas and the catalyst for effective catalytic decomposition. The presently described process on the other hand does not require such high temperature heating of the feed gas hence economic than the methods described in the published journals.

Reference also may be made to the patent of Hamon and Duclos (Fr patent no FR 2,847,830) who have used solid solution of mix oxides of cerium and zirconium in high temperature ranging from 700 to 1000° C. to decompose $N_2O$ to $N_2$ and $O_2$. The problem with zirconium oxide type catalysts is that they work only in high temperature and undergoes structural modification after some use hence not durable. Apart from structural degradation the high temperature associated with the system leads to sintering of oxide grains leading to porosity loss and effective specific surface. In the said patent the inventors have used crushed pellets of $ZrO_2$ and $CeO_2$ solid solution of particle size between 0.5 to 1 mm. The $ZrO_2$:$CeO_2$ ratio in the system was in the range somewhere between 80:20 and 20:80, in addition to it the catalyst contained other element like Yttrium in minor percentage composition. The catalyst thus contained toxic oxides like cerium oxide which almost invariably contains traces of thorium emitting alpha particles. The presently invented catalyst is free from such radioactive or heavy metal ion hazards. Similarly, reference also may be made to another U.S. Pat. No. 5,472,677 dated December, 1995 by Farris et al.) where it has been described invention of a $N_2O$ decomposition catalyst derived from Co—Al type LDH powders.

In all of these papers or patents the catalytic decomposition experiments were carried out by using either catalyst powders or pellets. Both of these forms of catalysts had their own distinct disadvantages e.g. powder form of catalysts give rise to high pressure drop and pellets on the other hand give rise to core sintering due to temperature gradient between the surface and the center. The coated honeycomb monolithic catalyst used in the present invention does not possess such disadvantages. Indeed the pressure drop across the small unitary parallel passages of honeycomb type ceramic monoliths is two to three times smaller than the same in a collection of spherical catalyst pellets of equivalent area.

Reference may be made about the use of coated honey-comb type monolithic catalyst containing LDHs as one of the coating component for the following U.S. Pat. No. 6,923,945 by Chen S F dated January, 2004 and No. 6,419,890 by Li Y dated July, 2002). In the first patent LDH has been added with other inorganic components alumina, zirconia, rare earth oxides and platinum metals etc. and applied as a coat to trap $SO_x$ so that actual 'Three Way Catalyst' is not destroyed. In the second patent also LDHs have been added in the form of wash coatings over ceramic honey-combs to alleviate decrease of activity of 'Three Way Catalyst', but in none of these catalysts novel particle-particle interaction like the one between negatively charged smectites with positively charged LDHs, as claimed in the present patent, to form stable gels have been used. It is to be noted here that in none of these catalysts LDH particles were disaggregated to their individual nano sheet levels by taking course to any physical or chemical route nor they were dispersed to a non flocculated, viscous state to coat as thin films over any favourably structured solid surface.

Figure 1:
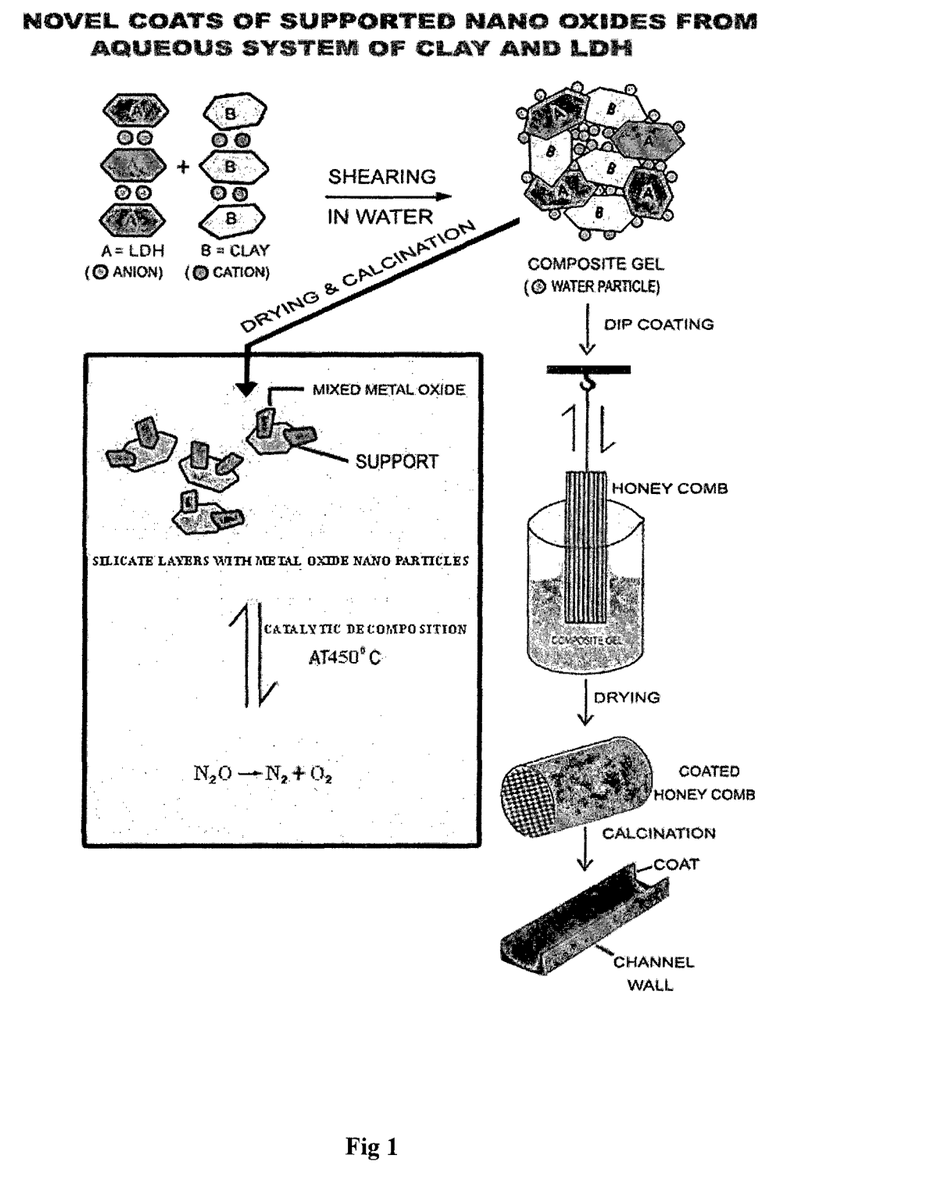
FIG. 1 The scheme of exfoliation of LDH or LDH sheets by interaction with clay and its consequent coating in the form of active nano oxides over honeycomb surfaces FIG. 2 PXRD patterns of (I) pre-calcined Na-montmorillonite clay after passing $N_2O$ gas (II) pre-calcined Ni—Al LDH before passing $N_2O$ gas (III) pre-calcined Ni—Al LDH after passing $N_2O$ gas & (IV) pre-calcined composite of Na-montmorrilonite +Ni—Al LDH after passing $N_2O$ gas [where A-Mg$_x$ (Mg, Fe)$_3$(Si, Al)$_4$O$_{10}$(OH)$_2$.4H$_2$O— JCPDS PDF No:16-613; JCPDS PDF No: 32-993; C—SiO$_2$—JCPDS PDF No: 14-654; D-Na$_{0.03}$ (Al, Mg)$_2$Si$_4$O$_{10}$(OH)$_2$.8H$_2$O— JCPDS PDF No: 29-1499; E-NiO-JCPDS PDF No: 04-835].

As the present patent is based upon this remarkable gelation property of LDH and swelling clay composites which pave the way for various positive advantages viz. the swelling clay component acting as a film producing ingredient upon which nano dimensional active mixed metal oxides of suitable bi and trivalent combinations having layered morphology are supported out in the form of bill-boards in the pathway of gas molecule streams, or the extremely good non-Newtonian flow behaviour helping in preparing reproducible green coats of desired thickness over suitable ceramic matrix by film forming techniques like dip or spin coating etc (FIG. 1).

As such LDH-clay composites have been reported by Goswamee et al. (Indian patent No 235052). The present process is a novel approach of mixed metal oxidic nano sheets coated monolithic catalysts useful for the decomposition of toxic $N_2O$ and a process for the preparation thereof, which have advantages like increased activity due to nano dimensionality, supported projection, layered morphology and tunable metal ion composition.

OBJECTIVES OF THE INVENTION

The main object of the present invention is to provide mixed metal oxidic nano sheets coated monolithic catalysts useful for the decomposition of toxic $N_2O$ and a process for the preparation thereof.

Another objective of the present invention is to provide a process for the decomposition of $N_2O$.

SUMMARY OF THE INVENTION

Accordingly, the present invention provides a mixed metal oxidic nano-sheet coated monolithic catalyst which comprises LDH (layered double oxide) and clay in mole ratio ranging between 0.2:1 to 1:0.2% w/v coated over ceramic honeycomb monoliths of 250 to 450 cells per square inch (CPSI).

In an embodiment of the present invention metals in LDH are selected from the group consisting of Zinc, Magnesium, Chromium, Aluminium and Nickel.

In one embodiment of the present invention clay is selected from the group consisting of montmorillonite, laponite, hectorite.

In another embodiment of the present invention ceramic monolith used is cordierite/mulite honey-comb monolith having 250 to 400 Channels Per Square Inch (CPSI).

In another embodiment of the present invention a process for the preparation of mixed metal oxidic nano-sheet coated monolithic catalyst, wherein the said process comprising the steps of;
a. providing LDH:clay composite in ratio of 0.2:1 to 1:0.2% w/v by known method;
b. homogenising LDH:clay composite as obtained in step (a) with high speed homogeniser at 8000-14000 RPM for 5 to 15 minutes further dispersing under ultrasonication by using 0.5 or 1 inch titanium horn in a high intensity ultrasonic processor at above 15 kHz frequency of 20 to 40% amplitude for 3-10 minutes with 1.5-4.5 second pulser on and 1.0-2.0 second pulser off mode and 1 inch (25 mm) solid titanium horn with a total spell of sonication for 0.5 to 3.5 hours over a period of 4 to 10 days with 5 to 24 hours gap between each spell; dip-coating the prepared gels over cordierite/mulite honey-comb monolithic supports of 250 to 400 Channels Per Square Inch (CPSI) at dipping rates of 5 to 20 cm/min and withdrawal rates of 1 to 20 cm/min followed by drying the dip-coated monoliths at 80-160° C. and calcining the dried coated monoliths at 350 to 650° C. to obtain mixed metal oxidic nano-sheet coated monolithic catalyst.

Still in another embodiment of the present invention a process for decomposition of $N_2O$ gas using LDH (layered double hydroxides)-clay composite coated on a ceramic monolith, wherein the said process comprises flowing $N_2O$ gas premixed with He over mixed LDH-clay composite coated on a ceramic monolith in reactor at a flow rate ranging between 5 to 50 ml/minute at temperature ranging between 300 to 550° C. for a period ranging between 30 to 120 minutes to obtain Nitrogen and Oxygen.

Still in another embodiment of the present invention reactor used is a cylindrical quartz reactor with a reaction area of 20-80 cm$^3$, length 10-60 cm and diameter 2-3 cm.

Still in another embodiment of the present invention Specific Decomposition Efficiencies (SDE) of the reaction is in the range of 20,000 to 40,000%/gram Still in another embodiment of the present invention $N_2O$ conversion is in the range of 90 to 98%.

BRIEF DESCRIPTION OF THE DRAWINGS

A—SDE of pre-calcined Ni—Al LDH powder after 25 minutes of reaction time at 450° C. inside a quartz tube (SDE-394)

B—SDE of pre-calcined Na-Montmorillonite powder after 25 minutes of reaction time at 450° C. inside a quartz tube (SDE-504)

C—SDE of Ni—Al LDH component in the calcined coats of Ni—Al LDH suspension over honeycomb monolithic support after 25 minutes of reaction time at 450° C. inside a quartz tube (SDE-814)

D—SDE of pre-calcined dried composite gel of Ni—Al LDH & Na-Montmorillonite coated over honeycomb monolithic support after 25 minutes of reaction time at 300° C. inside a quartz tube (SDE-6094)

E—SDE of pre-calcined composite gel Ni—Al LDH & Na-Montmorillonite coated over honeycomb monolithic support after 25 minutes of reaction time at 450° C. inside a quartz tube (SDE-11942)

F—SDE of Ni—Al LDH component in the calcined coats of composite gel of Ni—Al LDH & Na-Montmorillonite over honeycomb monolithic support after 25 minutes of reaction time at 300° C. inside a quartz tube (SDE-21333)

G—SDE of Ni—Al LDH component in the calcined coats of composite gel of Ni—Al LDH & Na-Montmorillonite over honeycomb monolithic support after 25 minutes of reaction time at 450° C. inside a quartz tube. (SDE-41801)

DETAILED DESCRIPTION OF THE INVENTION

The present invention provides a process for the decomposition of toxic $N_2O$ gas over mixed metal oxidic nano sheets coated ceramic monolithic which combines reacting oxides and salts of metals in a known manner so as to prepare LDHs or mixed metal layered hydroxides such as Ni—Al, Mg—Al, Zn—Cr—Al type possessing positive layer charge; preparing a stable gel by adding swellable clay having a negative charge such as montmorillonite, laponite, hectorite etc. in the LDH:clay ratio of 0.2:1 to 1:0.2% (w/v) respectively in an aqueous medium and homogenising the same with high speed homogeniser at 8000-14000 RPM for five to fifteen minutes; further dispersing under ultrasonication by using 0.5 or 1 inch titanium horn in a high intensity ultrasonic processor at above 15 kHz frequency of 20 to 40% amplitude for 3-10 minutes with 1.5-4.5 second pulser on and 1.0-2.0 second pulser off mode and 1 inch (25 mm) solid titanium horn with a total spell of sonication for 0.5 to 3.5 hours over a period of 4 to 10 days with an approximate 5 to 24 hours gap between each spell; dip-coating the prepared gels over cordierite/mulite honey-comb monolithic supports of 250 to 400 Channels Per Square Inch (CPSI) at dipping rates of 5 to 20 cm/min and withdrawal rates of 1 to 20 cm/min; drying the dip-coated monoliths at 80-160° C. and calcining the dried coated monoliths at 350 to 650° C. to develop the alumino-silicate supported nano-oxide coats over honey-comb ceramic substrates; decomposition study of $N_2O$ gas in a He flow at a flow rate of 5 to 50 ml/minute at 400 to 600° C. temperature in a cylindrical quartz reactor with a reaction area of 20-80 cm$^3$, length 10-60 cm and diameter 2-3 cm respectively.

Figure 2:
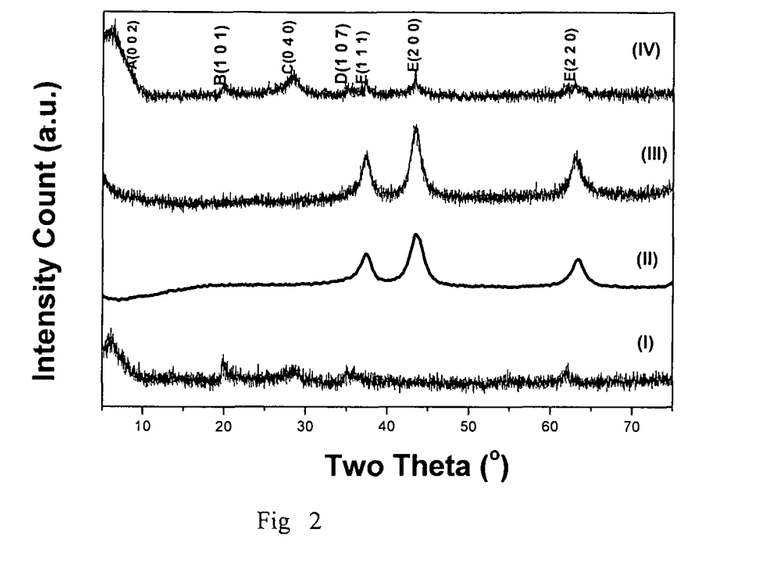

In contrary to the prior art, the novelty in the present approach is the exfoliation of LDH particles to individual nano sheets by using a special type of particle-particle interaction between the edges of negatively charged smectites with positively charged basal faces of LDHs to form stable gels where LDH particles are dispersed in the form of nano sheets in the body of the gel (FIG. 1). This gel is then coated over solid supports to form thin films containing exfoliated LDH sheets of specific metal ion combinations which are then thermally converted to mixed metal oxidic nano sheets to form the active catalyst species. As the present invention is based upon this remarkable gelation property of LDH and swelling clay composites, it ultimately paves the way for various positive advantages viz. the swelling clay component acting as a thin film producing ingredient upon which nano dimensional active metal oxides of suitable bi and trivalent combination having layered morphology are supported out in the form of billboards on the gas pathways, the extremely good non-Newtonian flow behaviour of composite gels help in preparing reproducible green coats of desired thickness over suitable ceramic matrix by dip-coating, exfoliation of LDH aggregated layers to individual nano-sheets during gel formation stage etc. Specifically, in comparison to earlier patent of Goswamee et al. (Indian patent No 235052) the present process is mainly based on structuring the catalyst in the form of thin coats over honeycomb monolithic supports which enhances the percentage decomposition ability of the active ingredients several thousand times than that of the powdered composite catalysts thereby complying to the one of the principles of Green Chemistry i.e. maximize the atom economy by increasing the efficiency of products, processes and systems by designing for maximization of mass, energy, space and time efficiency. LDHs were prepared by taking 100 mL distilled water in a reactor. To this additional 25 mL 0.1 M NaOH was added. The pH of the solution was raised to 10. The reactor was heated to 50° C. and kept the temperature constant. Stoichiometric amount of $Na_2CO_3$ in 200 to 500 ml distilled water and 200 to 500 ml salt mixtures of stoichiometric amount of $NiCl_2.6H_2O$ or $Ni(NO_3)_2.6H_2O$ or $Ni(SO_4).6H_2O$ and $AlCl_3.6H_2O$ or $Al(NO_3)_3.9H_2O$ or $Al_2(SO_4)_3.9H_2O$ were kept on adding slowly maintaining the pH of the solution between 8-11. The slurry obtained was stirred for some more hours. The content was then aged at 50-100° C. for 12-36 hrs. The product was finally washed with distilled water, dried in air oven and kept in plastic bottle. The product was characterized by XRD in powder diffractometer, which gave pattern typical of layered structure with high intensity (001) peaks at regular interval of d-spacings along with specific peaks for other hkl reflections (FIG. 2). The formations of nanosheets of NiO in the powdered calcined LDH as well as in the calcined composites derived from it were evidenced from Scherrer equation. The application of the equation to the (hkl 200) plane of NiO phase identified in the calcined LDH gave NiO nanosheets of dimension ~3.3 nm and the same in the composite derived from it gave NiO nanosheets of dimension ~6.3 nm. Similarly, thermal characterization of the synthesized products was also carried out by DTA-TGA at different heating rates under different atmospheres FIG. 3.

Purification of commercial grade montmorillonite obtained from M/S ONGCL (India) was done by separating the non-clay i.e. <2 μm equivalent spherical diameter fraction by sedimentation technique. The suspension obtained was dried to powdered state. The organic matter present in it has been destroyed by boiling the separated fraction with $H_2O_2$. Further purification of the clay in the form of homo-ionisation was carried out by treating the clay with 1N aqueous NaCl in room temperature under sonication for 100 minutes at different periods extending over a span of one week with one-inch (25 mm) solid probe titanium horn in a high intensity ultrasonic processor model VCX 500 (from M/S Sonics and Materials Inc., USA). The treated clay were then dialysed in a dialysis bag (from M/S Sigma Chemicals Co., USA) in distilled water for several weeks and constantly changing the water and monitoring the conductivity till the Na content in the dialysed water was below 5 ppm.

Stable gels of montmorillonite clay-Ni—Al LDH system in different LDH-clay ratios were prepared from aqueous suspensions of 0.075:0.5, or 4.35:4.35 or 0.6:0.75% w/v by homogenising the same with high speed homogeniser at 8000-14000 RPM for five to fifteen minutes under ultrasonication by using 0.5 or 1 inch titanium horn in a high intensity ultrasonic processor; at above 15 kHz frequency of 20 to 40% amplitude for 3-10 minutes with 1.5-4.5 second pulser on and 1.0-2.0 second pulser off mode and 1 inch (25 mm) solid titanium horn with a total spell of sonication for 0.5 to 3.5 hours over a period of 4 to 10 days with an approximate 5 to 24 hours gap between each spell.

The prepared gel was then dip-coated above honeycomb Cordierite supports of 250 to 400 Channels Per Square Inch (CPSI) at a dipping rate of 5 to 20 cm/min and withdrawal rate of 1 to 20 cm/min using a KSVD dip coater; drying the dip-coated monoliths at 80-160° C. and calcining the dried coated monoliths at 350 to 650° C. to develop the aluminosilicate supported nano-oxide coats over honey-comb ceramic substrates. The preferable coating load for an effective composite is 0.000029 g/mm$^2$ where weight gained for a single coating profile per honeycomb is 0.1102 g.

Decomposition study was carried out by using a premixed $N_2O$ gas (960 ppm, in Helium) and using different catalysts like calcined and uncalcined clay, LDH and clay-LDH composite powders as well as monoliths; experiments carried out shows that up to 98% conversion of $N_2O$ at 450-550° C. at a space velocity of 5 to 20 hr$^{-1}$ using Ni—Al LDH-montmorillonite coated over honeycomb supports can be obtained, the products of catalytic decomposition was analysed by using Unibead C, Porapak Q, Haysep DB as separating column with Thermal Conductivity or Electron Capture Detector in GC. Calibration of GC was done from a premixed calibration standard containing $N_2O$, $N_2$ and $O_2$ at standard ppm with Helium as balance. Also the product and reactant gas were analysed in a Shimadzu 10 cm IR Gas Cell fitted with NaCl prism.

Figure 4:
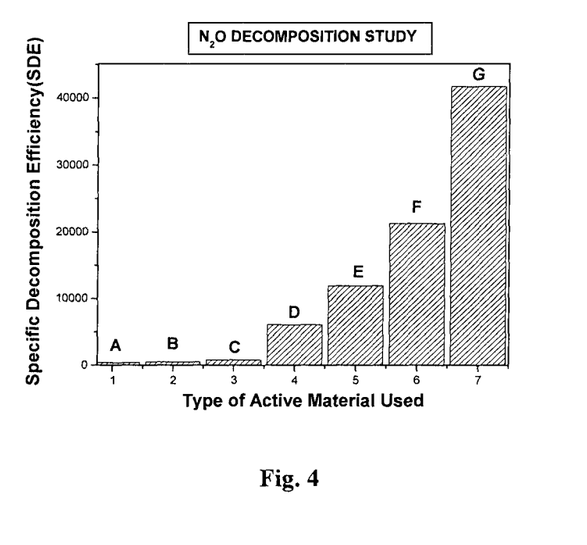
FIG. 4 shows a comparison of N2O decomposition ability of Ni—Al LDH alone, its composite in powdered form as well as in the form of thin films coated over solid honeycomb in terms of Specific Decomposition Efficiencies (SDE=percentage decomposition/weight of active LDH component %/gram)

The comparison of catalytic $N_2O$ decomposition abilities of calcined LDH alone, its composite in powdered form as well as in the form of thin films coated over solid honeycomb substrates was carried out by dividing the percentage decomposition with the weight of active LDH component present in the system, the same is represented in terms Specific Decomposition Efficiencies (SDE) as shown in FIG. 4.

Mg—Al LDHs were prepared by taking 100 mL distilled water in a reactor. To this additional 25 mL 0.1 M NaOH was added. The pH of the solution was raised to 10. The reactor was heated to 50° C. and kept the temperature constant. Stoichiometric amount of $Na_2CO_3$ in 200 to 500 ml distilled water and 200 to 500 ml salt mixtures of stoichiometric amount of $MgCl_2.6H_2O$ or $Mg(NO_3)_2.6H_2O$ or $Mg(SO_4).6H_2O$ and $AlCl_3.6H_2O$ or $Al(NO_3)_3.9H_2O$ or $Al_2(SO_4)_3.9H_2O$ were kept on adding slowly maintaining the pH of the solution between 8-11. The slurry obtained was stirred for some more hours. The content was then aged at 50-100° C. for 12-36 hrs. The product was finally washed with distilled water, dried in air oven and kept in plastic bottle. The product was characterized by XRD in powder diffractometer, which gave pattern typical of layered structure with high intensity (001) peaks at regular interval of d-spacings along with specific peaks for other hkl reflections. Similarly, thermal characterization of the synthesized product was also carried out by DTA-TGA at different heating rates under different atmospheres.

Purification of commercial grade montmorillonite obtained from M/S ONGCL (India) was done by separating the non-clay i.e. <2 μm equivalent spherical diameter fraction by sedimentation technique. The suspension obtained was dried to powdered state. The organic matter present in it has been destroyed by boiling the separated fraction with $H_2O_2$. Further purification of the clay in the form of homoionisation was carried out by treating the clay with 1N aqueous NaCl in room temperature under sonication for 100 minutes at different periods extending over a span of one week with one-inch (25 mm) solid probe titanium horn in a high intensity ultrasonic processor model VCX 500 (from M/S Sonics and Materials Inc., USA). The treated clay were then dialysed in a dialysis bag (from M/S Sigma Chemicals Co., USA) in distilled water for several weeks and constantly changing the water and monitoring the conductivity till the Na content in the dialysed water was below 5 ppm. Stable gels of montmorillonite clay-LDH system in different LDH-clay ratios were done by preparing aqueous suspensions of 0.075:0.5, or 4.35:4.35 or 0.6:0.75% w/v by homogenising the same with high speed homogeniser at 8000-14000 RPM for five to fifteen minutes under ultrasonication by using 0.5 or 1 inch titanium horn in a high intensity ultrasonic processor; at above 15 kHz frequency of 20 to 40% amplitude for 3-10 minutes with 1.5-4.5 second pulser on and 1.0-2.0 second pulser off mode and 1 inch (25 mm) solid titanium horn with a total spell of sonication for 0.5 to 3.5 hours over a period of 4 to 10 days with an approximate 5 to 24 hours gap between each spell.

The prepared gel was then dip-coated above honeycomb Cordierite supports of 250 to 400 Channels Per Square Inch (CPSI) at dipping rate of 5 to 20 cm/min and withdrawal rate of 1 to 20 cm/min using a KSVD dip coater; drying the dip-coated monoliths at 80-160° C. and calcining the dried coated monoliths at 350 to 650° C. to develop the aluminosilicate supported nano-oxide coats over honey-comb ceramic substrates.

Figure 5:
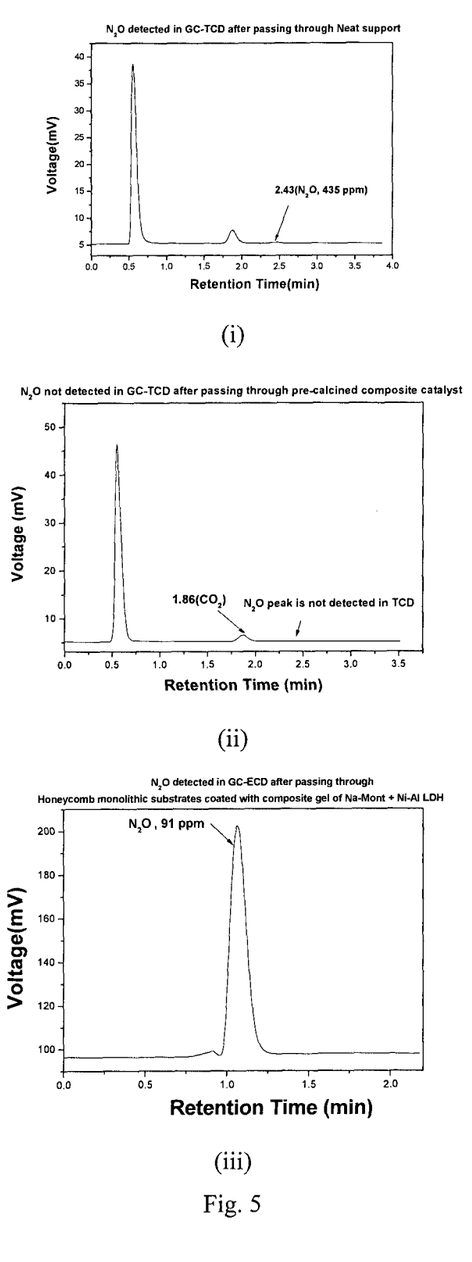
FIG. 5 (i) Chromatogram of product gas after passing through powdered LDH support (ii) Chromatogram of product gas after passing through composite powder catalyst & (iii) Chromatogram of product gas after passing through pre-calcined honeycomb monolithic substrates coated with composite gel.

Decomposition study was carried out by using a premixed $N_2O$ gas (960 ppm, in Helium) for the study of its decomposition using different catalysts like calcined and uncalcined clay, LDH and clay-LDH composite powders as well as monoliths; experiments carried out showed over 50% conversion of $N_2O$ at 450-550° C. at a space velocity of 5 to 20 h$^{-1}$ using Mg—Al LDH-montmorillonite coated over honeycomb supports can be obtained, the products of catalytic decomposition was studied by using Unibead C, Porapak Q, Haysep DB as separating column with Thermal Conductivity and Electron Capture detector in GC. Calibration of GC was done from a premixed calibration standard containing $N_2O$, $N_2$ and $O_2$ at standard ppm with Helium as balance, (FIG. 5). Also, the product and reactant gas were analysed in a Shimadzu 10 cm IR Gas Cell fitted with NaCl prism.

Figure 3:
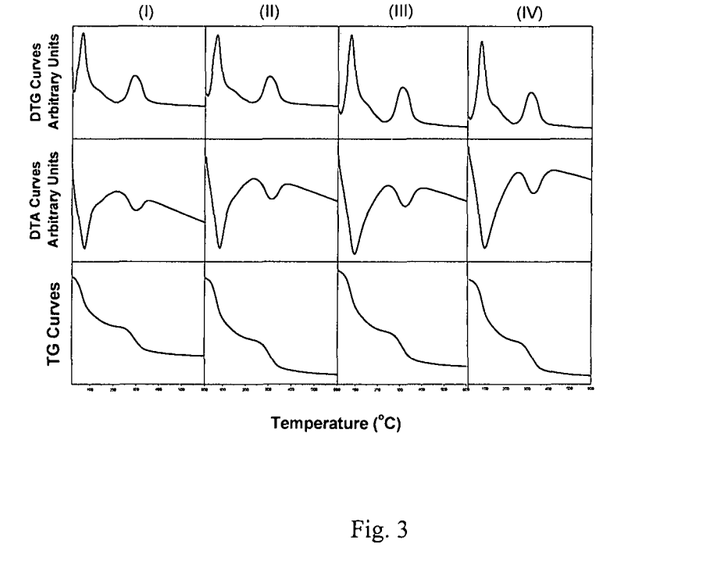
FIG. 3—A representative figure of DTA-TGA characterization of the synthesized Ni—Al LDH carried out at different heating rates Where, (I)—Thermal curves of Ni—Al LDH at 5° C./min heating rate (II)—Thermal curves of Ni—Al LDH at 10° C./min heating rate (III)—Thermal curves of Ni—Al LDH at 15° C./min heating rate (IV)—Thermal curves of Ni—Al LDH at 20° C./min heating rate

Zn—Cr—Al LDH was synthesised by acid phase hydrolysis method by reacting ZnO with mixture of 1M aqueous $CrCl_3$ or $Cr_2(SO_4)_3$ or $Cr(NO_3)_3$ and $AlCl_3$ or $Al_2(SO_4)_3$ or $Al(NO_3)_3$ solutions respectively with $Cr^{3+}:Al^{3+}$ ratios 0.1:0.9 to 0.9:0.1 M. The product was characterized by XRD in powder diffractometer, which gave pattern typical of layered structure with high intensity (001) peaks at regular interval of d-spacings along with specific peaks for other hkl reflections. Similarly, thermal characterization of the synthesized product was also carried out by DTA-TGA at different heating rates under different atmospheres (FIG. 3).

Purification of commercial grade montmorillonite obtained from M/S ONGCL (India) was done by separating the non-clay i.e. <2 μm equivalent spherical diameter fraction by sedimentation technique. The suspension obtained was dried to powdered state. The organic matter present in it has been destroyed by boiling the separated fraction with $H_2O_2$. Further purification of the clay in the form of homoionisation was carried out by treating the clay with 1N aqueous NaCl in room temperature under sonication for 100 minutes at different periods extending over a span of one week with one-inch (25 mm) solid probe titanium horn in a high intensity ultrasonic processor model VCX 500 (from M/S Sonics and Materials Inc., USA). The treated clay were then dialysed in a dialysis bag (from M/S Sigma Chemicals Co., USA) in distilled water for several weeks and constantly changing the water and monitoring the conductivity till the Na content in the dialysed water was below 5 ppm. Stable gels of montmorillonite clay-LDH system in different LDH-clay ratios were done by preparing aqueous suspensions of 0.075:0.5, or 4.35:4.35 or 0.6:0.75% w/v by homogenising the same with high speed homogeniser at 8000-14000 RPM for five to fifteen minutes under ultrasonication by using 0.5 or 1 inch titanium horn in a high intensity ultrasonic processor; at above 15 kHz frequency of 20 to 40% amplitude for 3-10 minutes with 1.5-4.5 second pulser on and 1.0-2.0 second pulser off mode and 1 inch (25 mm) solid titanium horn with a total spell of sonication for 0.5 to 3.5 hours over a period of 4 to 10 days with an approximate 5 to 24 hours gap between each spell.

The prepared gel was then dip-coated above honeycomb Cordierite supports of 250 to 400 Channels Per Square Inch (CPSI) at a dipping rate of 5 to 20 cm/min and withdrawal rate of 1 to 20 cm/min using a KSVD dip coater; drying the dip-coated monoliths at 80-160° C. and calcining the dried coated monoliths at 350 to 650° C. to develop the alumino-silicate supported nano-oxide coats over honey-comb ceramic substrates. The dip-coated monoliths were dried at 80-160° C. and calcined the dried coated monoliths at 350 to 650° C. to develop the alumino-silicate supported nano-oxide coats over honey-comb ceramic substrates.

Decomposition study was carried out by using a premixed $N_2O$ gas (960 ppm, in Helium) for the study of its decomposition using different catalysts like calcined and uncalcined clay, LDH and clay-LDH composite powders as well as monoliths; experiments carried out showed over 60% conversion of $N_2O$ at 450-550° C. at a space velocity of 5 to 20 $hr^{-1}$ using Zn—Cr—Al LDH-montmorillonite coated over honeycomb supports can be obtained, the products of catalytic decomposition was studied by using Unibead C, Porapak Q, Haysep DB as separating column with TC detector in GC. Calibration of GC was done from a premixed calibration standard supplied containing $N_2O$, $N_2$ and $O_2$ at standard ppm with Helium as balance.

In the present invention initially a stable gel is prepared containing LDH and clays. LDHs as such do not form stable gels in aqueous medium as they are non swelling crystalline substances. In presence of LDHs the normal gelation behaviour of swelling clays is enhanced by several times and in the process the LDH layers exfoliates to their individual nano sheets. The enhancement of gelation is due to positive negative electrostatic interaction between positively charged LDH surface and negatively charged montmorillonite edges and surfaces, which together forms a 'house-of-card' structure. Water molecules are entrapped within these cards forming the stable gel. Such stability gives the opportunity to coat the gels over solid ceramic supports more particularly over ceramic honey-comb monoliths. On calcination the two different components of the gel forming the green wet coat is decomposed to two different constituents: first the clay component which decomposes to some layered alumino-silicate oxides upon which seats the mixed metal oxidic nano sheets derived from LDHs. These nano sheets are distributed over the solid surface forming an effective thin film of well dispersed high surface area active oxide particles having high potential for catalytic decomposition of toxic gases. The catalytic potential of the oxides is further enhanced by the monolithic shape of the complete set-up which permits a stable laminar flow of the gases through the system. Similar approach to preparation of monolithic LDH coated catalysts for environmental or other catalytic applications by taking advantage of gelation behaviour of two oppositely charged inorganic solid namely LDHs and swelling clays have not been made. The present approach takes advantage of gel forming nature of the said composites, which helps in dip-coating the gel over ceramic monolithic pre-form. The same otherwise is not possible as crystalline LDHs as such do not form coatable stable gels. Apart from this, the clay component helps in supporting the nano-sized oxidic particles derived from LDH precursors over an alumino-silicate type coat in the channels of honey-combs.

EXAMPLES

The following examples are, given by way of illustration therefore should not be construed to limit the scope of the present invention.

Example 1

Ni—Al LDHs were prepared by taking 100 mL distilled water in a reactor followed by adding 25 mL 0.1 M NaOH. The pH of the solution was raised to 10. The reactor was heated to 50° C. and kept the temperature constant. 38.16 g of $Na_2CO_3$ in 300 ml distilled water and 250 ml salt mixture of 57.05 g of $NiCl_2.6H_2O$ and 19.32 g $AlCl_3.6H_2O$ were kept on adding slowly maintaining the pH of the solution between 8.5-10.0. The slurry obtained was stirred for 3 hours. The content was then aged at 75° C. for 24 hrs. The product was finally washed with distilled water, dried in air oven at 60° C. for 24 hours and kept in plastic bottle. The product was characterized by XRD in powder diffractometer. Purification of commercial grade montmorillonite obtained from M/S ONGCL (India) was done by separating the non-clay i.e. <2 µm equivalent spherical diameter fraction by sedimentation technique. The suspension obtained was dried to powdered state. The organic matter present in it has been destroyed by boiling the separated fraction with $H_2O_2$. For this 100 g of separated clay in 100 ml fresh $H_2O_2$ was added and boiled the mixture over a water bath at 70° C. till there is no effervescence coming out of the suspension. The organics free mass is then dried over water bath at 70° C. and stored. Further purification of the clay in the form of homo-ionisation was carried out by treating 14 g of clay with 200 ml 1 molar aqueous NaCl solution in room temperature under sonication for total 100 minutes at different arbitrary intervals extending over a span of one week with one-inch (25 mm) solid probe titanium horn in a high intensity ultrasonic processor model VCX 500 (from M/S Sonics and Materials Inc, USA). The treated clay were then dialysed in a dialysis bag (from M/S Sigma Chemicals Co., USA) in distilled water for several weeks and constantly changing the water and monitoring the conductivity till the Na content in the dialysed water was below 5 ppm.

Stable gels of montmorillonite clay-Ni—Al LDH system in different LDH-clay ratios were prepared from aqueous suspensions of 0.075:0.5, or 4.35:4.35 or 0.6:0.75% w/v by homogenising the same with high speed homogeniser at 10,000 RPM for 10 minutes under ultrasonication by using 1 inch titanium horn in a high intensity ultrasonic processor at above 15 kHz frequency of 33% amplitude for 5 minutes with 1.5-4.5 second pulser on and 1.0-2.0 second pulser off mode and 1 inch (25 mm) solid titanium horn with a total spell of sonication for 3 hours over a period of 7 days with an approximate 8 hours gap between each spell.

Figure 6A:
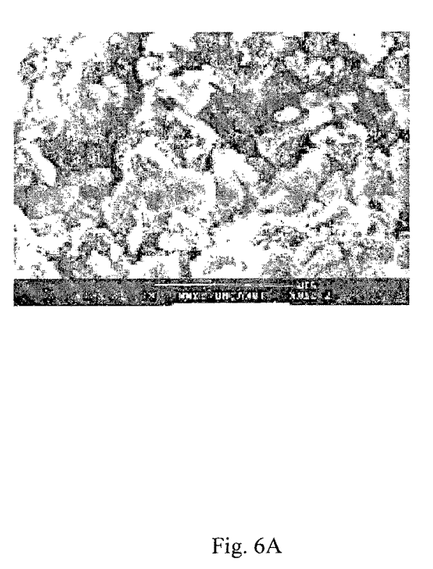
FIG. 6(A) shows SEM images of surface view of the coats of composites over honeycomb & (B) shows EDXA pattern of coats of composites over honeycomb surfaces FIG. 7 Stainless Steel catalytic converter containing coated monoliths for toxic gases FIG. 8—In the bar diagrams, A-SDE in terms of the alumino-silicate carrier (Al—Si) used (SDE-394), B-SDE in terms of the Layered Double Hydroxide (LDH) used (SDE-504), C-SDE in terms LDH present in coated calcined composite gel over honeycomb monolith inside a S.S Catalytic Converter (SDE-42522), D-SDE in terms of the composite gel inside a S.S Catalytic Converter (SDE-12143).
Figure 6B:
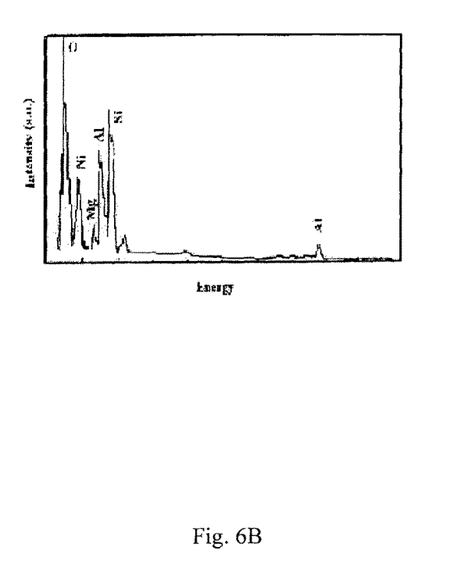
Figure 7:
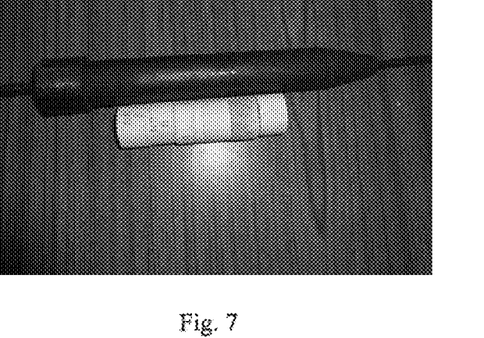
Figure 8:
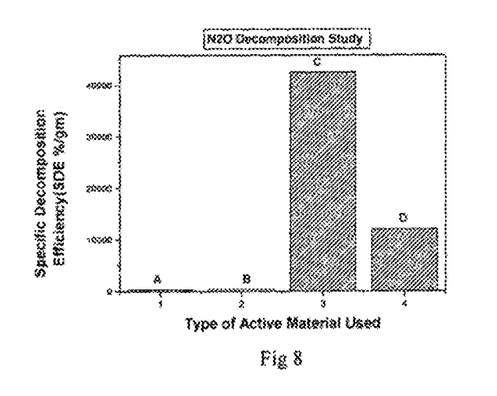

The prepared gel were then dried and calcined to form powders. The powders were characterized by XRD (FIG. 2), SEM-EDXA (FIG. 6) etc. XRD patterns showed presence of NiO phase, while SEM-EDXA patterns gave alumino-silicate powders from clay precursors over which NiO particles are present in the form of well distributed fine grains of 75 nm dimension as shown by Scanning Electron Microscopy (FIG. 6A).

30 g calcined MMLH-clay powder (<150 μm size) was packed in a quartz tube of 4 cm diameter to make a bed of 10 cm length. The two ends of the tube were fixed with inlet and outlet tubes in a leak proof manner with the rubber corks. The tube was placed inside a cylindrical furnace. A flow of $N_2O$ and He in flow ratios 31.5:70 $cm^3$/min was maintained. At the outlet tube of the gas a Tedlar Bag was added to collect the product gas to analyse the different gases flowing out of the reactor in a GC. The fall in concentration of $N_2O$ and consequent increase of $N_2$ and $O_2$ in the product stream was measured by Unibead C as separating column with TC Detector in GC. Calibration of GC was done from a premixed calibration standard containing $N_2O$, $N_2$ and $O_2$ at standard ppm with Helium as balance. It has been observed that there is 98% and 94% conversion after 9 hours and 0.5 hours respectively. The effectiveness of the catalyst was observed even after 13 hours of reaction at 500° C.

Example 2

Mg—Al LDHs were prepared by taking 100 mL distilled water in a reactor followed by adding 25 mL 0.1 M NaOH. The pH of the solution was raised to 10. The reactor was heated to 50° C. and kept the temperature constant. 38.16 g of $Na_2CO_3$ in 300 ml distilled water and 250 ml salt mixture of 40.25 g of $MgCl_2.6H_2O$ and 15.94 g $AlCl_3.6H_2O$ were kept on adding slowly maintaining the pH of the solution between 8.5-10.0. The slurry obtained was stirred for 3 hours. The content was then aged at 75° C. for 24 hrs. The product was finally washed with distilled water, dried in air oven and kept in plastic bottle. The product was characterized by XRD in powder diffractometer.

Purification of commercial grade montmorillonite obtained from M/S ONGCL (India) was done by separating the non-clay i.e. <2 μm equivalent spherical diameter fraction by sedimentation technique. The suspension obtained was dried to powdered state. The organic matter present in it has been destroyed by boiling the separated fraction with $H_2O_2$. For this 100 g of separated clay in 100 ml fresh $H_2O_2$ was added and boiled the mixture over a water bath at 60-70° C. till there is no effervescence coming out of the suspension. The organics free mass is then dried over water bath at 60-70° C. and stored. Further purification of the clay in the form of homo-ionisation was carried out by treating 14 g of clay with 200 ml 1 molar aqueous NaCl solution in room temperature under sonication for total 100 minutes at different arbitrary intervals extending over a span of one week with one-inch (25 mm) solid probe titanium horn in a high intensity ultrasonic processor model VCX 500 (from M/S Sonics and Materials Inc, USA). The treated clay were then dialysed in a dialysis bag (from M/S Sigma Chemicals Co., USA) in distilled water for several weeks and constantly changing the water and monitoring the conductivity till the Na content in the dialysed water was below 5 ppm.

Stable gels of montmorillonite clay-Mg—Al LDH system in different LDH-clay ratios were prepared from aqueous suspensions of 0.075:0.5, or 4.35:4.35 or 0.6:0.75% w/v by homogenising the same with high speed homogeniser at 10,000 RPM for ten minutes under ultrasonication by using 1 inch titanium horn in a high intensity ultrasonic processor at above 15 kHz frequency of 33% amplitude for 5 minutes with 1.5-4.5 second pulser on and 1.0-2.0 second pulser off mode and 1 inch (25 mm) solid titanium horn with a total spell of sonication for 3 hours over a period of 7 days with an approximate 8 hours gap between each spell.

The prepared gel was then dip-coated above honeycomb Cordierite supports of 400 Channels Per Square Inch (CPSI) at a dipping rate of 5 cm/min and withdrawal rate of 5 cm/min; drying the dip-coated monoliths at 80° C. and calcining the dried coated monoliths at 550° C. for 30 minutes to develop the alumino-silicate supported nano-oxide coats over honey-comb ceramic substrates. The coating load for an effective composite is 0.000029 $g/mm^2$ where weight gained for a single coating profile per honeycomb is 0.1102 g.

Decomposition study was carried out by using a premixed $N_2O$ gas (960 ppm, in Helium) ratio of $N_2O$ and He (0.1:99.9% Volume/Volume) and using different catalysts like calcined and uncalcined clay, LDH and clay-LDH composite powders as well as monoliths. Experiments carried out showed over 50% conversion of $N_2O$ in 30 minutes at 450° C. at a space velocity of 5 $hr^{-1}$ using Mg—Al LDH-montmorillonite coated over honeycomb supports can be obtained. The products of catalytic decomposition were studied by using. Unibead C as separating column with TC Detector in GC. Calibration of GC was done from a premixed calibration standard containing $N_2O$, $N_2$ and $O_2$ at standard ppm with Helium as balance. The conversion of $N_2O$ is 93% even after 3 hours of reaction.

Example 3

Zn—Cr—Al LDH was synthesised by acid phase hydrolysis method by reacting 20 g ZnO with 200 ml mixture of 1M aqueous $CrCl_3$ or $Cr_2(SO_4)_3$ or $Cr(NO_3)_3$ and $AlCl_3$ or $Al_2(SO_4)_3$ or $Al(NO_3)_3$ solutions respectively with $Cr^{3+}$:$Al^{3+}$ ratios 0.1:0.9, 0.5:0.5 and 0.9:0.1 M. The slurry obtained was stirred for 24 hours. The content was then aged at 75° C. for 24 hrs. The product was finally washed with distilled water, dried in air oven at 70° C. for 24 hours and kept in plastic bottle. The product was characterized by XRD in powder diffractometer.

Purification of commercial grade montmorillonite obtained from M/S ONGCL (India) was done by separating the non-clay i.e. <2 μm equivalent spherical diameter fraction by sedimentation technique. The suspension obtained was dried to powdered state. The organic matter present in it has been destroyed by boiling the separated fraction with $H_2O_2$. Further purification of the clay in the form of homo-ionisation was carried out by treating the clay with 1N aqueous NaCl in room temperature under sonication for 100 minutes at different periods extending over a span of one week with one-inch (25 mm) solid probe titanium horn in a high intensity ultrasonic processor model VCX 500 (from M/S Sonics and Materials Inc., USA). The treated clay were then dialysed in a dialysis bag (from M/S Sigma Chemicals Co., USA) in distilled water for several weeks and constantly changing the water and monitoring the conductivity till the Na content in the dialysed water was below 5 ppm.

Stable gels of montmorillonite clay-Zn—Cr—Al LDH system in different LDH-clay ratios were prepared from aqueous suspensions of 0.075:0.5, or 4.35:4.35 or 0.6:0.75% w/v by homogenising the same with high speed homogeniser at 10,000 RPM for ten minutes under ultrasonication by using 1 inch titanium horn in a high intensity ultrasonic processor at above 15 kHz frequency of 33% amplitude for 5 minutes with 1.5-4.5 second pulser on and 1.0-2.0 second pulser off mode and 1 inch (25 mm) solid titanium horn with a total spell of sonication for 4.0 hours over a period of 7 days with an approximate 8 hours gap between each spell.

The prepared gel was then dip-coated above honeycomb Cordierite supports of 400 Channels Per Square Inch (CPSI) at a dipping rate of 5 cm/min and withdrawal rate of 5 cm/min; drying the dip-coated monoliths at 80° C. and calcining the dried coated monoliths at 550° C. for 30 minutes to develop the alumino-silicate supported nano-oxide coats over honey-comb ceramic substrates. The coating load for an effective composite is 0.000012 g/mm$^2$ where weight gained for a single coating profile per honeycomb is 0.0812 g Decomposition study was carried out by using a premixed $N_2O$ gas (960 ppm, in Helium) in a ratio of $N_2O$ and He (0.1:99.9% Volume/Volume) and using different catalysts like calcined and uncalcined clay, LDH and clay-LDH composite powders as well as monoliths. Experiments carried out showed over 60% conversion of $N_2O$ in 30 minutes at 530° C. at a space velocity of 5 hr$^{-1}$ using Zn—Cr—Al LDH-montmorillonite coated over honeycomb supports can be obtained. The products of catalytic decomposition were studied by using Unibead C as separating column with TC Detector in GC. Calibration of GC was done from a premixed calibration standard containing $N_2O$, $N_2$ and $O_2$ at standard ppm with Helium as balance. The conversion of $N_2O$ is 90% even after 4 hours of reaction.

ADVANTAGES OF THE INVENTION

1. The present invention provide a process for the decomposition of nitrous oxide ($N_2O$) using mixed metal oxidic nano sheets laid or supported over alumino silicate grains in the channels of honeycomb monolithic reactors, which in turn offer high atom efficient catalysis.
2. The process provides an efficient catalytic device which is cheap as it is free from costly noble metal components rather it is composed of environmentally benign cheap oxidic constituents capable of decomposing $N_2O$ gas at lower temperatures than the existing catalysts.
3. The present invention provides a rugged device containing nano-oxidic catalytic particles derived from LDHs suitable to be incorporated in a stationary as well as moving source of $N_2O$ gas so that the problem of global warming and consequent mandatory challenge of developing suitable technology under the broad dictum of Kyoto Protocol is effectively attended to.

We claim:

1. Mixed metal oxidic nano-sheet coated monolithic catalyst comprising a composite gel wherein the gel comprises layered double hydroxide and clay in ratio ranging between 0.2:1 to 1:0.2% w/v of the gel coated over ceramic honeycomb monoliths of 250 to 450 cells per square inch.

2. The mixed metal oxidic nano-sheet coated monolithic catalyst as claimed in claim 1, wherein metals in layered double hydroxides are selected from the group consisting of Zinc, Magnesium, Chromium, Aluminium and Nickel.

3. The mixed metal oxidic nano-sheet coated monolithic catalyst as claimed in claim 1, wherein clay is selected from the group consisting of montmorillonite, laponite, hectorite.

4. The mixed metal oxidic nano-sheet coated monolithic catalyst as claimed in claim 1,
   wherein ceramic monolith used is cordierite/mulite honey-comb monolith having 250 to 400 Channels Per Square Inch.

5. A process for the preparation of mixed metal oxidic nano-sheet coated monolithic catalyst as claimed in claim 1, wherein the said process comprising the steps of;
   a. providing layered double hydroxides:clay composite in ratio of 0.2:1 to 1:0.2% w/v of the gel;
   b. homogenising layered double hydroxides:clay composite as obtained in step (a) with a homogeniser at 8000-14000 RPM for 5 to 15 minutes further dispersing under ultrasonication by using 0.5 or 1 inch titanium horn in a high intensity ultrasonic processor at above 15 kHz frequency of 20 to 40% amplitude for 3-10 minutes with 1.5-4.5 second pulser on and 1.0-2.0 second pulser off mode and 1 inch (25 mm) solid titanium horn with a total spell of sonication for 0.5 to 3.5 hours over a period of 4 to 10 days with 5 to 24 hours gap between each spell; dip-coating the prepared gels over cordierite/mulite honey-comb monolithic supports of 250 to 400 Channels Per Square Inch at dipping rates of 5 to 20 cm/min and withdrawal rates of 1 to 20 cm/min followed by drying the dip-coated monoliths at 80-160° C. and calcining the dried coated monoliths at 350 to 650° C. to obtain mixed metal oxidic nano-sheet coated monolithic catalyst.

6. The process for decomposition of $N_2O$ gas using layered double hydroxides-clay composite coated on a ceramic monolith as claimed in claim 1, wherein the said process comprises flowing $N_2O$ gas premixed with He over mixed layered double hydroxides-clay composite coated on a ceramic monolith in reactor at a flow rate ranging between 5 to 50 ml/minute at temperature ranging between 300 to 550° C. for a period ranging between 30 to 120 minutes to obtain Nitrogen and Oxygen.

7. The process for decomposition of $N_2O$ gas as claimed in claim 6, wherein reactor used is a cylindrical quartz reactor with a reaction area of 20-80 cm$^3$, length 10-60 cm and diameter 2-3 cm.

8. The process for decomposition of $N_2O$ gas as claimed in claim 6, wherein Specific Decomposition Efficiencies of the reaction is in the range of 20,000 to 40,000%/gram.

9. The process for decomposition of $N_2O$ gas as claimed in claim 6, wherein $N_2O$ conversion is in the range of 90 to 98%.

* * * * *